United States Patent [19]
Whitman et al.

[11] 3,819,534
[45] June 25, 1974

[54] CATALYST FOR ELIMINATION OF POLLUTANTS IN AUTO-EXHAUST GAS

[75] Inventors: Robert Henry Whitman, Stamford, Conn.; Louis Leonard Lento, Jr., Saddle River, N.J.

[73] Assignee: American Cyanamid Company, Stamford, Conn.

[22] Filed: May 18, 1972

[21] Appl. No.: 254,593

[52] U.S. Cl.............. 252/457, 252/455 R, 252/465, 252/468, 252/475
[51] Int. Cl........................ B01j 11/32, B01j 11/00
[58] Field of Search.......... 252/457, 468, 465, 475, 252/463

[56] References Cited
UNITED STATES PATENTS

| | | | |
|---|---|---|---|
| 3,061,555 | 10/1962 | McGrew et al. | 252/468 X |
| 3,291,564 | 12/1966 | Kearby | 252/465 X |
| 3,329,727 | 7/1967 | Louvar | 252/463 X |
| 3,470,105 | 9/1969 | Briggs et al. | 252/465 X |

*Primary Examiner*—C. F. Dees
*Attorney, Agent, or Firm*—William J. van Loo

[57] ABSTRACT

There is disclosed a catalyst composition comprising a support material upon which is deposited an alkaline earth metal oxide, chromium trioxide, and copper oxide in proportions which achieve desirable conversion temperatures and catalyst stability for use in a catalytic muffler for auto-exhaust gases. The method of catalyst preparation is also disclosed.

9 Claims, No Drawings

CATALYST FOR ELIMINATION OF POLLUTANTS IN AUTO-EXHAUST GAS

This invention relates to novel oxidation cataylsts and to methods by which said catalysts are obtained. The invention also relates to a process for using the catalysts to oxidize hydrocarbon combustion exhaust gases and thereby reduce environmental pollution hazards.

The exhaust gases from the combustion of hydrocarbon fuels such as gasoline, diesel fuel, and the like in internal combustion engines contain mixtures of carbon monoxide and various hydrocarbons, both saturated and unsaturated, nitrogen and other constituents. These mixtures are both poisonous and obnoxious.

In addition to the known hazards resulting from the inhalation of combustion exhaust gases of hydrocarbon fuels, such gases have, of comparatively recent times, been identified with smog formation and, to a lesser extent, with various forms of cancer.

The hazards and nuisance created by hydrocarbon combustion exhaust gases, particularly olefins and carbon monoxide, from internal combustion engines have, over the years, resulted in a number of processes, catalysts, and apparatus whereby the reduction or elimination of the harmful components of these gases has been the primary object.

A relatively common device employed for this purpose has been what is referred to as a "catalytic muffler" which normally refers to a device which is to be substituted into the exhaust line of an internal combustion engine in lieu of an ordinary muffler. This has been a particularly preferred area of activity in view of the fact that the cost of such a device is reduced by the cost of a conventional muffler normally employed, and by other obvious advantages. Such devices are inserted into the exhaust line of an internal combustion engine and by the action of catalysts contained therein, oxidize the exhaust gases so that the exit gases from the muffler contain reduced amounts of the harmful and obnoxious constituents of the exhaust gases.

Many of the former devices proved unsuccessful for a number of reasons. A significant factor affecting these devices, of course, is the catalytic materials employed therein. Prior catalysts generally have a comparatively short activity life and the difficulties of recharging the device with fresh catalyst have hampered their adoption. Prior catalysts also have the deficiency of requiring high temperature operation before effective oxidation is obtained, thus requiring long warm-up time before control of the hazardous and obnoxious content of exhaust gases is effective. The prior art catalysts are generally poor in their ability to oxidize carbon monoxide unless large capacity air induction devices are provided in conjunction with the catalytic muffler. However, while such provision increases conversion of carbon monoxide to carbon dioxide, it also greatly increases the operating temperature of the catalytic bed of the muffler. This increased temperature greatly shortens the activity life of the catalyst and causes shrinkage of the catalyst particles. Shrinkage of the catalyst particles, in turn, provides bypasses, or channels, through which exhaust gases can escape without undergoing a desired amount of oxidation. Shrinkage of the catalyst particles also permits more freedom of movement of individual particles which, in turn, under the influence of mechanical shock such as normally is associated with a moving automobile powered by an internal combustion engine, can cause severe attrition of the catalyst particles thus resulting in production of fines, which provides an increased amount of bypasses or channels.

In considering a catalyst composition for the specific application in catalytic mufflers, therefore, a number of property requirements must be satisfied. First, of course, the catalyst composition must be highly active in the oxidation of carbon monoxide and olefin hydrocarbons in the exhaust fumes. This activity must be obtained without the need for large capacity air induction devices to be used in conjunction with the catalytic muffler. Next, the temperatures at which the catalyst is effective in converting signicant quantities of carbon monoxide and olefin hydrocarbons in the exhaust fumes must be low enough to dispense with lengthy engine warm-ups. Dimensional stability of the catalyst material under the conditions of operation is another important requirement and should be minimal to avoid escape of unconverted contaminants. Catalyst density is a further requirement and low density enables large quantities to be used with minimal added weight of the catalytic muffler. Low density also enables faster warm-up of a given volume of catalyst to be achieved.

In accordance with the present invention, there is provided a catalyst composition which comprises a support material upon which is deposited from about 1.5 to about 10 percent of an alkaline earth metal expressed as its oxide weight, from about 1 to about 12 percent of copper expressed as its oxide weight, and from about 0.5 to about 40 percent of chromium expressed as its oxide weight, said weights being based on the weight of said support material, so as to provide a catalyst composition which effects about 50 conversion of carbon monoxide at a temperature of about 550°F. or less, effects about 50 conversion of hydrocarbons at a temperature of about 650°F. or less, and exhibits shrinkage of about 14 percent or less under the conditions of use.

There is also provided a process for preparing the catalyst composition which comprises treating a support material with from about 1.5 to about 10 percent of an alkaline earth metal compound, expressed as its oxide weight, calcining the treated support material at a temperature of about 1,800°F. to convert the alkaline earth metal compound to the oxide and stabilize the support material, treating the stabilized support with from about 0.5 to about 40 percent of a chromium compound, expressed as its oxide weight, and from about 1.0 to about 12 percent of a copper compound, expressed as its oxide weight, said weight percentages being based on the weight of said support material, and again calcining the thus-treated support material to convert the added metal compounds to their oxides.

There is also provided a process for oxidizing carbon monoxide and hydrocarbons which comprises contacting said gases with the novel catalyst composition.

As the support material used in the catalyst composition of the present invention may be employed various forms of alumina, silica, magnesia, zirconia, and mixtures thereof such as alumina/silica. A particularly preferred support material is gamma alumina and intermediates which lead to this form of alumina. The particular support material is prepared in suitable form in accordance with conventional procedures. By suitable form is meant that form which is normally prepared for treatment with promoters. The form may be that of extrudates, prepared by mulling or other techniques, of spheres, coarse grains, tablets, and the like, all prepared by conventional techniques. It is generally preferred, however, to employ extrudates, since support material in this form is better suited for use in catalytic mufflers, a preferred usage of the catalyst composition. The preformed support should be calcined prior to use in the present invention.

It is frequently advantageous to employ an alumina which is silica stabilized. By the expression "silica stabilized" is meant an alumina which contains from about 2 to about 10 silica. A preferred composition contains about 5 percent silica. The use of this type of alumina as base material produces a more stable catalyst which is markedly more resistant to shrinkage upon drying and calcining. However, alumina alone provides an outstanding base or support material.

According to one procedure, a suitable alumina for catalytic purposes may be prepared by precipitation from a solution of alkali metal aluminate, such as sodium and potassium aluminate, as a result of the addition of an acid, such as sulfuric acid, or of aluminum sulfate, such as in commercial alum. When such hydrated alumina is spray dried, it is usually characterized by a low apparent bulk density usually within the range of about 0.2 to about 0.3 cc. per gm. Such a base material is well suited for use in the present invention, the details of preparation being described in U.S. Pat. No. 2,657,115. The base material prepared as described above is mulled and extruded, then dried in an oven and finally calcined at 1,100°F. prior to use in the present invention.

For this invention, in order to have the required activity, shrinkage resistance, stability to steaming, permeability to gas flow (to prevent excessive back pressure), catalytic activity for the conversion of hydrocarbons and carbon monoxide, low ignition temperature, and other cited requirements, it is preferred that the base material have a pore volume of about 0.3 to about 1.4 cc. per gm. and a surface area of between 200–350 square meters per gram. It is also desirable that the particle size have a minimum diameter of at least one-twentieth of an inch to about one-fifth of an inch and preferably about one-tenth of an inch.

The selected support material, preferably a calcined alumina extrudate, is first treated with a sufficient quantity of an alkaline earth metal compound to provide from about 1.5 to about 10 percent alkaline earth metal oxide based on the weight of the calcined support material so as to stabilize said support against excessive shrinkage under conditions of use. Alkaline earth metals suitable for use include calcium, barium, strontium and mixtures thereof, with calcium being preferred. Suitable salts are those which may be impregnated uniformly on the support material. Aqueous solutions are greatly preferred and, accordingly, water-soluble salts such as calcium nitrate and the like are particularly preferred. The solution of alkaline earth metal compound used to impregnate the support material will be of proper concentration and amount to deposit the required amount of alkaline earth metal expressed as its oxide thereon.

After the support material has been impregnated with the alkaline earth metal compound by any of the conventional impregnation techniques, it is oven dried at a temperature of about 250°F. for about an hour and then calcined at 1,800°F. for at least one hour to convert the alkaline earth metal compound to its oxide and stabilize the support material. The temperature of 1,800°F. must be reached to obtain the desired stability, and lower temperatures do not produce acceptable results. Higher temperatures are not necessary and increase process costs without added benefits.

The primary purpose of the use of alkaline earth metal oxide in the final catalyst composition is to stabilize the same against excessive shrinkage during use. Depending upon the amounts of promoter metals to be applied subsequently, the range of about 1.5 to about 10 percent calcium, expressed as its oxide weight, based on the weight of the calcined support material, will generally provide catalyst compositions that have a shrinkage of 14 percent or less under conditions of use. High usages of copper as promoter generally causes increased shrinkage under conditions of use and necessitates usages of alkaline earth metal oxide at the upper level of the specified range. High usages of chromium as promoter generally reduces shrinkage tendencies of the support and enables usages of alkaline earth metal oxide at the lower level of the specified range. Excessive usage of alkaline earth metal oxide stabilizer should be avoided since such usage tends to reduce effectiveness of the final catalyst composition. Preferred usage of alkaline earth metal oxide is from about 2.0 to 5.0 percent, more preferably about 3.0 percent, by weight based on the weight of the calcined support material.

The first of the promoter metals required in the catalyst composition of the present invention is chromium in the form of its oxide. Chromic oxide may be employed in the broad range of from about 0.5 to about 40 percent, by weight, based on the weight of the calcined support material. In those applications where the catalyst composition is to be used in a catalytic muffler, however, it is generally preferred to limit the upper level of usage to about 14 percent, by weight, based on the weight of the calcined support material in order to obtain a final composition of density sufficiently low to provide rapid warm-up of the catalytic muffler bed.

The specific amount of chromic oxide that is used in any given instance will vary depending upon the amounts of copper oxide and alkaline earth metal oxides present. In any event, the amount of chromic oxide used will be properly selected from the range specified so as to give conversion temperatures for carbon monoxide and hydrocarbons of about 550°F. or less and 650°F. or less, respectively, said temperatures being those at which about 50 percent conversion of the exhaust gas components occurs.

The other of the promoter metals required in the catalyst composition of the present invention is copper in the form of its oxide. Copper oxide may be employed in the broad range of about 1.0 to about 12.0 percent, by weight based on the weight of the calcined support material. The specific amount of copper oxide that is used in any given instance will also vary, depending upon the amounts of chromic oxide and alkaline earth metal oxide present. In any event, the amount of copper oxide used will be properly selected from the range specified so as to provide conversion temperatures as indicated. The amount of copper oxide that may be employed is considerably more limited than that of chromic oxide due to adverse effects on catalyst shrinkage, as indicated above. Accordingly, in addition to selecting an amount of copper oxide that will provide the desired conversion temperatures, it is also necessary to make such selection in keeping with the shrinkage requirements of the final catalyst composition under conditions of use. Preferably the amount of copper oxide is in the range of about 2 to 9 percent.

In depositing the chromium and copper promoters on the alkaline earth metal oxide modified support material, conventional impregnation procedures are employed. While it is possible to deposit the promoters in combination or in various orders it is greatly preferred to deposit chromium promoter material first and then, in a subsequent step, to deposit copper promoter material. Various techniques such as spraying, pore saturation, and the like may be used. It is generally preferred to employ an aqueous medium to effect impregnation and, accordingly, it is preferred to employ water-soluble compounds of the promoter materials, which are converted upon calcination to the oxides. In carrying out impregnation of the promoter metals in a sequential manner, it is necessary, of course, to ensure that the subsequent impregnation does not remove or interfere with the prior impregnation. Thus, in sequential impregnation of the promoter metals, it is greatly preferred to employ a so-called "quick calcination" following impregnation of the individual promoter metal compounds so as to prevent removal by dissolution in the subsequently applied solution of the second individual promoter. By "quick calcination" as that term is employed herein is meant a calcination at a temperature of 1,100°F. for about an hour without an intermediate drying step. Normally, the impregnated support materials are first dried, then subjected to calcination. In the present invention, it has been found that by introducing the wet impregnated support materials directly into the calciner and quick-calcining at 1,100°F. for an hour, better activity results.

In a preferred embodiment of the invention, the calcined formed support material is impregnated with an aqueous solution of a calcium salt such as calcium nitrate, calcium acetate, calcium nitrate monohydrate, and the like so as to obtain the desired level of calcium. The impregnated support is then dried at 250°F. in an oven for approximately 1 hour and then calcined at 1,800°F. for at least 1 hour to obtain calcium oxide stabilized support material. The calcium oxide stabilized support is then impregnated with an aqueous solution of a chromium compound such as chromic acid so as to obtain the desired level of chromium. The wet impregnated support is quick-calcined at 1,100°F. for 1 hour. The chromium promoted calcium oxide stabilized support is then impregnated with an aqueous solution of a copper salt such as copper nitrate trihydrate and then subjected to quick-calcining at 1,100°F. for 1 hour.

Of the great number of characteristics which are desired in automobile exhaust gas conversion catalysts, at least three are considered essential and have criteria defined and recognized. The first is shrinkage, that is, it is desirable to keep the catalyst particle from shrinking under conditions of use. It is considered satisfactory if a catalyst shrinks less than about 14 percent and more desirable if the catalyst shrinks less than 10 percent of its original size. The second and third criteria relate to the hydrocarbon and carbon monoxide 50 percent conversion temperatures. These temperatures are defined as those at which 50 percent conversion of hydrocarbon and carbon monoxide in the exhaust gas is effected. It is, of course, desirable to have as low a 50 percent conversion temperature as possible. Thus, it is desirable that the hydrocarbon 50 percent conversion temperature be less than about 650°F. and more preferably less than about 600°F. Likewise it is desirable that the carbon monoxide 50 percent conversion temperature be less than 550°F. and more preferably less than 500°F. Of course it is possible to obtain even lower 50 percent conversion temperatures, such as 500°F. for hydrocarbon and 400°F. for carbon monoxide, and such temperatures should be obtained, if at all possible.

In all of the catalyst compositions of this invention, the catalyst is made up of oxides of copper, chromium, and calcium, with the balance being support material, preferably alumina. The particular proportions of promoter metal oxides and stabilizing alkaline earth metal oxide are in the range that fulfill the criteria specified and, therefore, eminently qualify the catalyst compositions of the present invention for use in catalytic mufflers.

As compared with prior art catalysts suitable for use in the oxidation of exhaust gases, the catalyst composition of the instant invention has several marked advantages. It results in a more effective oxidation of harmful olefins, including ethylene and propylene, as well as carbon monoxide. When a catalyst composition of this invention is used in a catalytic muffler associated with an automobile exhaust system, the presence of copper results in a substantially faster warm-up of the catalyst bed in comparison with those containing prior art catalysts. Faster warm-up of the catalyst bed results principally from oxidation of hydrocarbons and carbon monoxide by the copper oxide which performs effectively at low temperature. This oxidation at low temperature results in a rapid release of heat which aids in warming up the entire catalyst bed. The resulting faster warm-up of the entire bed enables total conversion to be achieved at short engine warmup times and reduces times to total conversion of the polluting hydrocarbons and carbon monoxide. Thus, instead of relying solely on engine warm-up to effect the higher temperatures necessary for total conversion, the catalyst composition of the present invention, by initially effecting partial conversion at low temperature, greatly accelerates warm-up of the catalyst bed by supplying the heat from the initial partial conversions. In addition to the substantial reduction in warmup time of the catalyst bed, the catalyst bed at the high operating temperatures reached is more effective for olefin conversion. The catalyst composition also enables substantial conversion of carbon monoxide to be achieved without the requirement for large capacity air induction devices. The catalyst composition also maintains good activity over long time periods of use and has high shrinkage resistance.

The invention is more fully illustrated by the examples which follow, wherein all parts and percentages are by weight unless otherwise specifically designated.

EXAMPLE 1

Five pounds of one-tenth inch diameter alumina-silica extrudates, which were prepared by mulling an alumina-silica powder with water and ammonia and extruding the mulled mixture, were oven-dried at 250°F. and then calcined at 1,100°F. The calcined extrudates were impregnated by spraying using 2.47 liters of an aqueous solution containing 0.65 pound of calcium nitrate tetrahydrate. The impregnated extrudates were then oven dried again at 250°F. for 1 hour and then calcined at 1,800°F. for 3 hours to obtain calcium oxide stabilized extrudates containing a nominal 3 percent, by weight, based on the weight of the original calcined extrudates, of calcium oxide on the 95:5 alumina:silica extrudates.

A portion, 113.5 grams of the calcium oxide stabilized extrudates prepared above were spray impregnated with 101 cc. of an aqueous solution containing 5.45 grams of chromic acid ($CrO_3$). The impregnated extrudates were quick-calcined at 1,100°F. for one hour to produce a nominal 3.5 percent of chromic oxide on the calcium oxide stabilized extrudates.

The calcium oxide stabilized extrudates also containing the chromic oxide as prepared above were next spray-impregnated with 94 cc. of an aqueous solution containing 22.5 grams of copper nitrate trihydrate and again quick-calcined to provide a nominal 5.3 percent of copper oxide.

Formal analyses of the final composition obtained above indicated the actual content to be 5.25 percent copper oxide, 2.83 percent chromic oxide, 2.62 percent calcium oxide and 89.3 percent aluminasilica support.

Into a reaction tube were placed 12.5 cubic centimeters of catalyst composition prepared as above and dried to remove any absorbed water. The catalyst composition was heated to 593°C., the furnace turned off, and a test exhaust gas mixture introduced. The test exhaust gas mixture which was used to simulate raw exhaust gas was a mixture of 1 percent carbon monoxide, 250 parts per million of propylene, 2.5 percent oxygen, and the balance nitrogen. This test exhaust gas mixture passed through a water saturator set at 46°C. prior to introduction, and a space velocity of 13,200 per hour was maintained. As the catalyst composition cooled, samples of the exit gas were taken and from these the percent conversion was determined. A plot of percent conversion versus temperature was made and from the resulting graph, the temperature corresponding to 50 percent conversion was obtained for both carbon monoxide and propylene. These temperatures were 473°F. and 478°F., respectively. The percentage shrinkage of the catalyst under conditions of use was 11.6 percent.

EXAMPLE 2

Example 1 was repeated in every material detail except that the impregnations were varied so as to obtain a final composition which contained 5.75 percent copper oxide, 3.5 percent chromic oxide, and 3.0 percent calcium. When tested as in Example 1, the 50 percent conversion temperatures were 527°F. for hydrocarbons and 470°F. for carbon monoxide. The percentage shrinkage of the catalyst was 13.6 percent.

EXAMPLE 3

A sample of exhaust gas catalyst comprising 5.1 percent by weight of cupric oxide and 11.3 percent by weight of chromic oxide as promoters on a 2.1 percent calcium oxide stabilized base comprising 95 percent alumina and 5 percent silica was prepared according to the procedure described for Example 1. When tested as in Example 1, the 50 percent conversion temperatures were 581°F. for hydrocarbons and 500°F. for carbon monoxide. The percentage shrinkage of the catalyst was 6.0 percent.

EXAMPLE 4

A sample of exhaust gas catalyst comprising 11.7 percent by weight of cupric oxide and 11.0 percent by weight of chromic oxide as promoters on a 1.1 percent calcium oxide stabilized base comprising 95 percent alumina and 5 percent silica was prepared following the general procedure of Example 1. When tested as in Example 1, the 50 percent conversion temperatures were 550°F. for hydrocarbons and 478°F. for carbon monoxide. The percentage shrinkage of the catalyst was 10.4 percent.

EXAMPLE 5

A sample of exhaust gas catalyst comprising 3.3 percent by weight of cupric oxide and 3.0 percent by weight of chromic oxide as promoters on 2.7 percent calcium oxide stabilized base comprising 95 percent alumina an 5 percent silica was prepared following the general procedure of Example 1. When tested as in Example 1, the 50 percent conversion temperatures were 577°F. for hydrocarbons and 563°F. for carbon monoxide. The percentage shrinkage of the catalyst was 9.8 percent.

EXAMPLE 6

A sample of exhaust gas catalyst comprising 2.2 percent by weight of cupric oxide and 1.6 percent by weight of chromic oxide as promoters on 1.7 percent calcium oxide stabilized base comprising 95 percent alumina and 5 percent silica was prepared following the general procedure of Example 1. When tested as in Example 1, the 50 percent conversion temperatures were 520°F. for hydrocarbons and 527°F. for carbon monoxide. The percentage shrinkage of the sample was 6.6 percent.

EXAMPLE 6

A sample of exhaust gas catalyst comprising 5.0 percent by weight of cupric oxide and 0.6 percent by weight of chromic oxide as promoters on 1.8 percent calcium oxide stabilized base comprising 95 percent alumina and 5 percent silica was prepared according to the general procedure of Example 1. When tested as in Example 1, the 50 percent conversion temperatures were 507°F. for hydrocarbons and 496°F. for carbon monoxide. The percentage shrinkage of the catalyst was 14.4 percent.

We claim:

1. A process for preparing a catalyst composition useful for oxidizing carbon monoxide and hydrocarbons which comprises: preparing a calcined support material from alumina, silica, magnesia, zirconia, or mixtures thereof; treating said support with an alkaline earth metal compound selected from calcium, barium, strontium compounds, and mixtures thereof in a quantity sufficient to deposit thereon from about 1.5 to about 10 percent, by weight, based on the weight of the calcined support, of said alkaline earth metal, expressed as its oxide; calcining the thus treated support at 1,800°F. for at least 1 hour so as to convert said alkaline earth metal compound to its oxide and stabilize said support against excessive shrinkage under conditions of use; impregnating said stabilized support with a chromium compound in a quantity sufficient to deposit thereon from about 0.5 to 40 percent, by weight, based on the weight of the calcined support, of chromium expressed as its oxide, $Cr_2O_3$ and with a copper compound in a quantity sufficient to deposit thereon from about 1 to 12 percent, by weight, based on the weight of the calcined support, of copper expressed as its oxide; and thereafter calcining the impregnated stabilized support.

2. The process of claim 1 wherein said chromium and said copper compounds are impregnated in separate steps in the order given and quick-calcining is employed in conjunction with each impregnation step.

3. The process of claim 1 wherein said alkaline earth metal compound is a calcium compound.

4. The process of claim 1 wherein said calcined support material is prepared from alumina/silica 95/5.

5. The process of claim 3 wherein the quantity of calcium compound is sufficient to deposit from about 2 to 5 percent, by weight, of calcium oxide.

6. The process of claim 5 wherein the amount of chromium compound is sufficient to deposit from about 1 to 14 percent, by weight of chromium oxide and the amount of copper compound is sufficient to deposit from about 2 to 9 percent, by weight of copper oxide.

7. The process of claim 5 wherein the amount of chromium compound is sufficient to deposit 2.83 percent, by weight, of chromium oxide and the amount of copper compound is sufficient to deposit 5.25 percent, by weight, of copper oxide.

8. The process of claim 5 wherein the amount of chromium compound is sufficient to deposit 3.5 percent, by weight, of chromium oxide and the amount of copper compound is sufficient to deposit 5.75 percent, by weight, of copper oxide.

9. A catalyst composition prepared by the process of claim 1.

* * * * *